(12) United States Patent
Senechal et al.

(10) Patent No.: US 12,012,211 B2
(45) Date of Patent: Jun. 18, 2024

(54) CARRIER DEVICE, SEATING AREA DIVIDER AND VEHICLE CABIN

(71) Applicant: Adient Aerospace, LLC, Bothell, WA (US)

(72) Inventors: Gary Lee Senechal, Lake Stevens, WA (US); Anthony Harcup, Surrey (GB)

(73) Assignee: Adient Aerospace, LLC, Bothell, WA (US)

( * ) Notice: Subject to any disclaimer, the term of this patent is extended or adjusted under 35 U.S.C. 154(b) by 0 days.

(21) Appl. No.: 18/303,935

(22) Filed: Apr. 20, 2023

(65) Prior Publication Data

US 2023/0249830 A1 Aug. 10, 2023

Related U.S. Application Data

(63) Continuation of application No. 17/120,994, filed on Dec. 14, 2020, now Pat. No. 11,655,035.

(60) Provisional application No. 62/947,895, filed on Dec. 13, 2019.

(51) Int. Cl.
*B64D 11/06* (2006.01)

(52) U.S. Cl.
CPC ...... *B64D 11/0627* (2014.12); *B64D 11/0606* (2014.12)

(58) Field of Classification Search
CPC ............ B64D 11/0023; B64D 11/0606; B64D 11/0627
See application file for complete search history.

(56) References Cited

U.S. PATENT DOCUMENTS

| | | | |
|---|---|---|---|
| 2007/0138821 A1 | 6/2007 | Mejuhas | |
| 2009/0200422 A1 | 8/2009 | Johnson | |
| 2009/0321574 A1* | 12/2009 | Erickson | F16B 21/06 29/525.01 |
| 2011/0042514 A1 | 2/2011 | Ehlers | |
| 2011/0233975 A1* | 9/2011 | Mindel | B64D 11/0689 188/371 |
| 2012/0112505 A1 | 5/2012 | Breuer et al. | |
| 2015/0210393 A1 | 7/2015 | Savian | |
| 2017/0129608 A1* | 5/2017 | Reams | B64D 11/0638 |

(Continued)

FOREIGN PATENT DOCUMENTS

| | | |
|---|---|---|
| DE | 102017210159 A1 | 9/2018 |
| GB | 2572446 A | 10/2019 |
| JP | 2000-142588 A | 5/2000 |

(Continued)

OTHER PUBLICATIONS

First Office Action for Japanse Patent Application No. 2022-102579, dated Jun. 27, 2023.

(Continued)

*Primary Examiner* — Philip J Bonzell
*Assistant Examiner* — Ashesh Dangol
(74) *Attorney, Agent, or Firm* — Jordan IP Law, LLC

(57) ABSTRACT

A carrier device for a seating area divider provided within a vehicle cabin, in particular an aircraft cabin, comprising at least a base member and a fixation device which is coupled to the base member to support the base member on a cabin floor. The base member is configured to carry a privacy divider screen of the seating area divider. The fixation device comprises at least a seat track locking member protruding perpendicular from the base member.

20 Claims, 11 Drawing Sheets

(56) References Cited

U.S. PATENT DOCUMENTS

2021/0147083 A1    5/2021  Dowty

FOREIGN PATENT DOCUMENTS

| JP | 2008-174231 A | 7/2008 |
| JP | 2014-532581 A | 12/2014 |
| WO | 2017079664 A1 | 5/2017 |

OTHER PUBLICATIONS

EP 20213474.8—Extended European Search Report, dated Apr. 29, 2021, 7 pages.
"First Office Action issued in Japanese Patent Application No. 2020-206443," dated Oct. 29, 2021, 3 pages.

* cited by examiner

CARRIER DEVICE, SEATING AREA DIVIDER AND VEHICLE CABIN

CROSS REFERENCE TO RELATED APPLICATIONS

This application is a Continuation of U.S. patent application Ser. No. 17/120,994 filed Dec. 14, 2020, which claims the benefit of and priority to U.S. Provisional Patent Application No. 62/947,895, filed on Dec. 13, 2019, the contents of which are incorporated by reference in its entirety.

BACKGROUND OF THE INVENTION

Field of the Invention

The present invention relates to a carrier device for a seating area divider provided in a vehicle cabin, in particular an aircraft cabin. Further, the present disclosure relates generally to a seating area divider comprising at least one privacy divider screen and said carrier device. Moreover, the present disclosure relates generally to a vehicle cabin comprising such a seating area divider.

Description of the Background Art

Seating area dividers, such as class dividers, are provided within a vehicle cabin, such as an aircraft cabin to improve an overall ambient feeling. For example, seating area dividers may be part of furniture structures of seat units arranged within a vehicle cabin.

However, carrier structures for seating area dividers need to be lightweight and easy to assemble and disassemble.

SUMMARY OF THE INVENTION

The disclosed examples are described in detail below with reference to the accompanying drawing figures listed below. The following summary is provided to illustrate examples or implementations disclosed herein. It is not meant, however, to limit all examples to any particular configuration or sequence of operations.

Examples herein provide an improved carrier device for a seating area divider provided within a vehicle cabin, in particular an aircraft cabin. The examples herein seek to improve fixation of the carrier device for the seating area dividers arranged along a centerline of the vehicle cabin.

In an implementation, provided herein is a carrier device for a seating area divider provided within a vehicle cabin, in particular an aircraft cabin, comprising at least a base member and a fixation device which is coupled to the base member to support the base member on a cabin floor. The base member is configured to carry a privacy divider screen of the seating area divider. The fixation device comprises at least a seat track locking member protruding perpendicular from the base member.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

In the following detailed description of the embodiments, numerous specific details are set forth in order to provide a more thorough understanding of the one or more embodiments. However, it will be apparent to one of ordinary skill in the art that the one or more embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The term "about," when used with respect to a physical property that may be measured, refers to an engineering tolerance anticipated or determined by an engineer or manufacturing technician of ordinary skill in the art. The exact quantified degree of an engineering tolerance depends on the product being produced and the technical property being measured. For a non-limiting example, two angles may be "about congruent" if the values of the two angles are within ten percent of each other. However, if an engineer determines that the engineering tolerance for a particular product should be tighter, then "about congruent" could be two angles having values that are within one percent of each other. Likewise, engineering tolerances could be loosened in other embodiments, such that "about congruent" angles have values within twenty percent of each other. In any case, the ordinary artisan is capable of assessing what is an acceptable engineering tolerance for a particular product, and thus is capable of assessing how to determine the variance of measurement contemplated by the term "about." Similarly, the term, "plurality," as used herein may also be referred to as a list, collection, or ensemble.

Figure 1A:
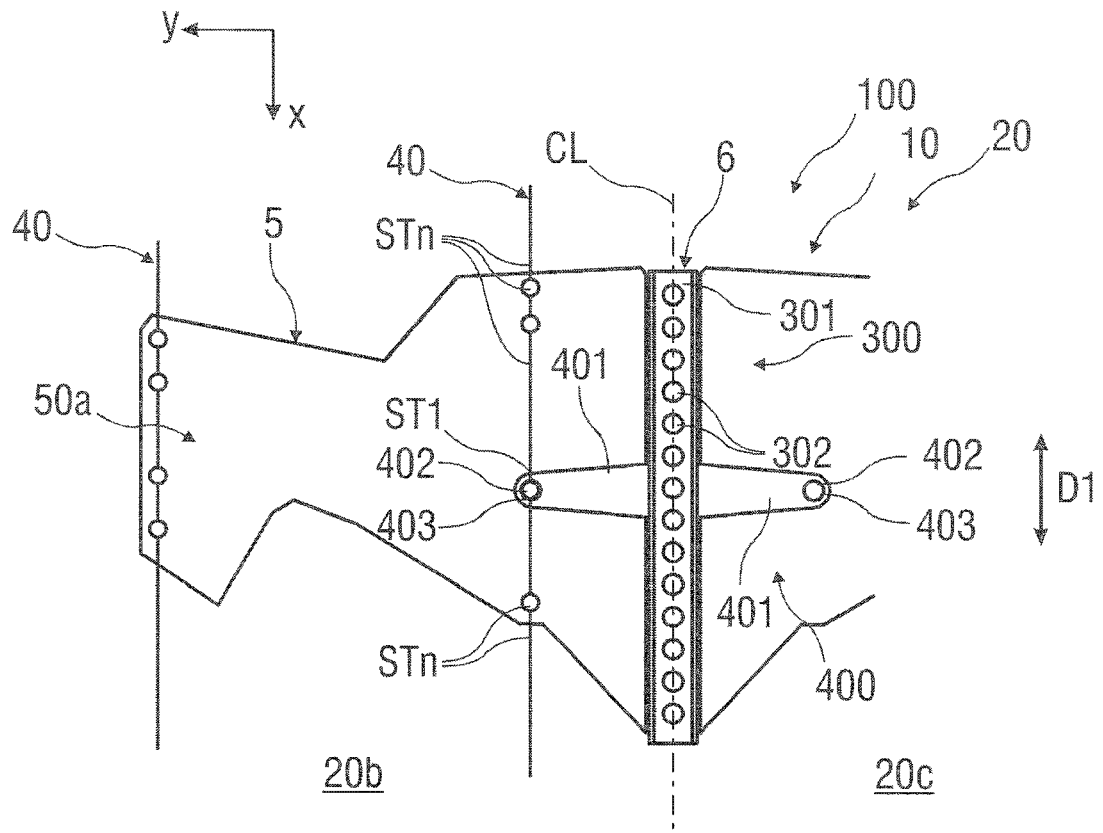
FIGS. 1A and 1B show schematically in top views an embodiment of a carrier device for a seating area divider provided within a vehicle cabin, in particular an aircraft cabin.
Figure 1B:
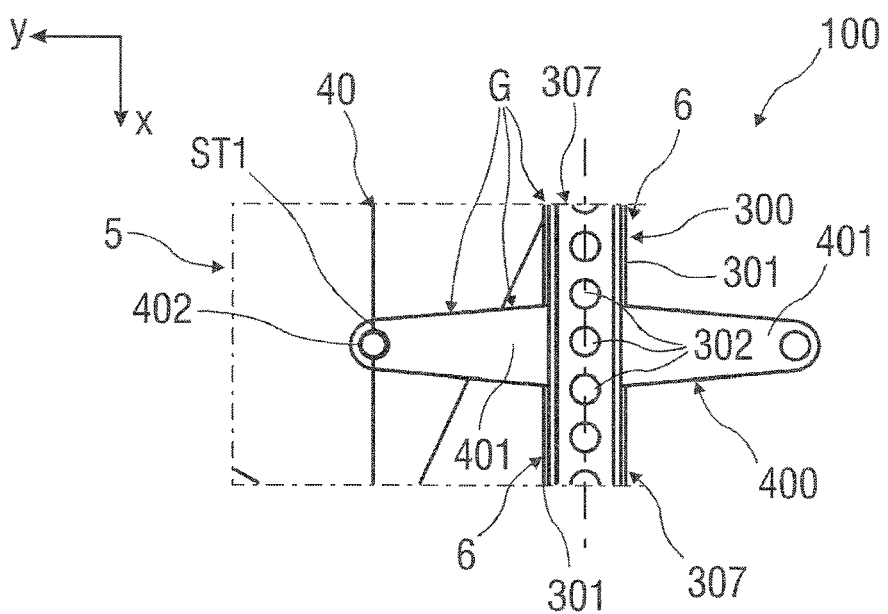
Figure 2:
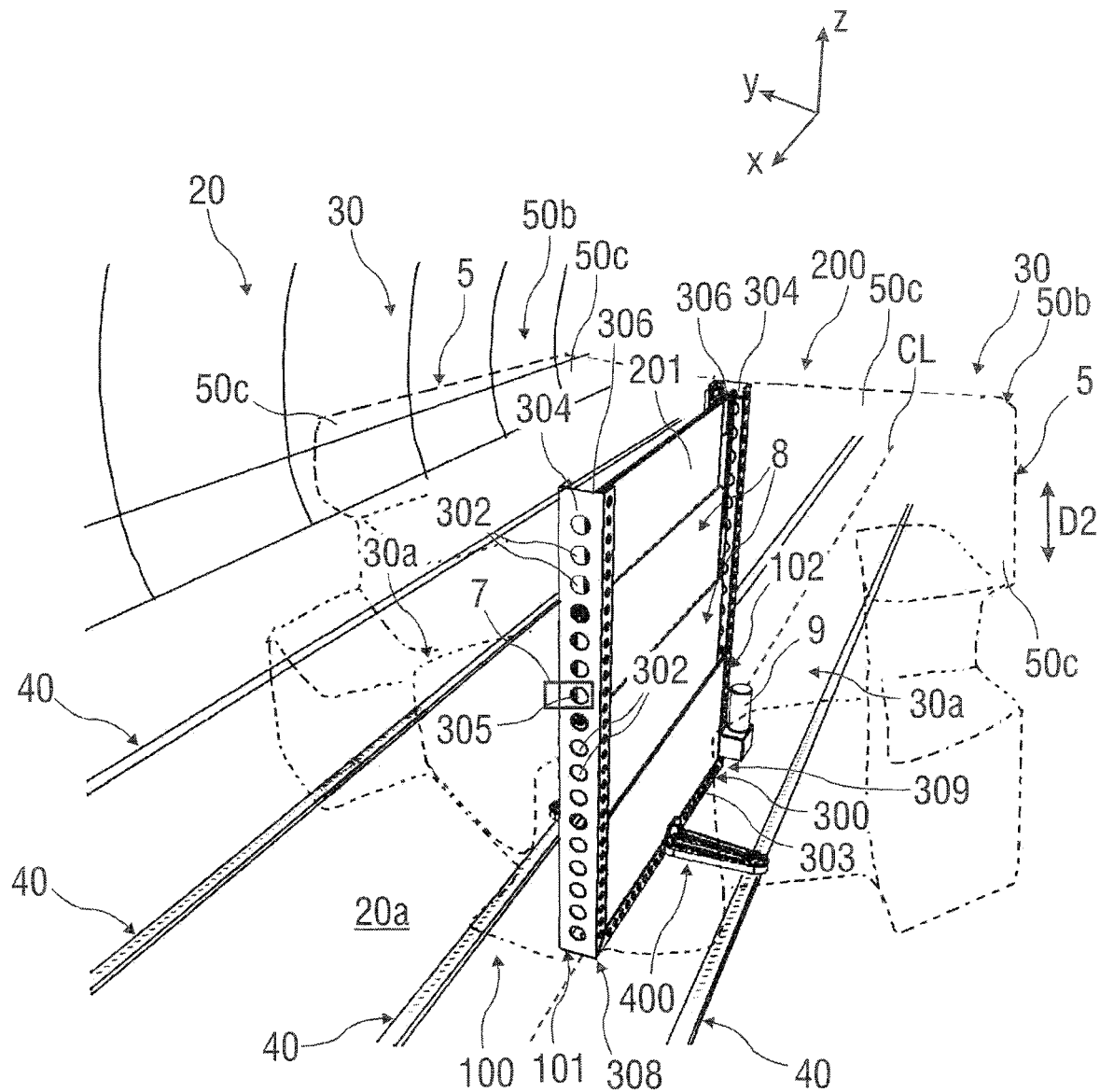
FIG. 2 shows schematically a perspective view of an embodiment of a vehicle cabin, in particular an aircraft cabin, comprising at least two seat units arranged along a centerline of the vehicle cabin and a seating area divider arranged between the two seat units.

FIGS. 1A and 1B show schematically in top views an embodiment of a carrier device 100 for a seating area divider 200, as shown in FIG. 2 in more detail. The carrier device 100 is arranged in a vehicle cabin 20 of an apparatus 1100. In the illustrated examples, the vehicle cabin 20 is an aircraft cabin. However any other passenger transportation vehicle or cabin is contemplated. In particular, the carrier device 100 is fixed to a cabin floor 20a.

The carrier device 100 is configured as a keel beam structure 10. The carrier device 100 comprises a base member 300. The base member 300 is configured as a bracket to support a privacy divider screen 201, as shown in FIG. 2. The base member 300 is arranged on a centerline CL of the cabin 20. For example, the centerline CL extends in a longitudinal direction of the cabin 20. It is also possible to arrange the base member 300 in any other position parallel or perpendicular to the centerline CL in the cabin 20.

The carrier device 100 is, for example, configured to be arranged between two seat units 30 and/or two seats 30a, as best shown in FIG. 2. For example, the carrier device 100 is configured to divide or separate two seating areas 20b, 20c within the cabin 20.

Further, the carrier device 100 comprises a fixation device 400 which is coupled to the base member 300 to support the base member 300 on the cabin floor 20a. The fixation device 400 comprises two seat track locking members 401 each protruding perpendicular from the base member 300.

The seat track locking members 401 are configured to fit on different seat track portions ST1-STn of a seat track 40 arranged on the cabin floor 20a. Commonly, a number of seat tracks 40 are arranged within the cabin 20, in particular on and along the cabin floor 20a. The seat tracks 40 are configured for positioning and fixing of seats 30a, as shown in FIG. 2, to the cabin floor 20a. The fixation device 400 comprises two seat track locking members 401. For example, the seat track locking members 401 are configured as footing of the base member 300 and support the base member 300 on the cabin floor 20a.

For example, the cabin floor 20a of an aircraft usually flexes during flight. To prevent flexing of the seating area divider 200 usually arranged adjacent and connected to at least one seat 30a and/or seat furniture structure 5, the carrier device 100 comprises the fixation device 400 with at least one seat track locking member 401 to fix the carrier device 100 and so as the seating area divider 200 to the cabin floor 20a. By fixation of the carrier device 100 to the seat track 40, the carrier device 100 is enabled to float adjacent to the seat 30a and/or seat furniture structure 5. For example, the seat track locking member 401 is mounted to the same seat track 40 as the respective seat 30a provided within the aircraft cabin 20. Therefore, possible gap creation between the divider 200 and the seat 30a is prevented, wherein gap creating may lead to unattractive optical appearance, disconcerting for a passenger and damaging of divider 200 and furniture parts 50b. Likewise, flexing of the floor 20a can also lead to components being pushed against each other, causing wear and/or damage of the seat 30a, seat furniture structure 5 and/or the seating area divider 200.

For example, the carrier device 100 is not directly connected with the seat 30a and seat furniture structure 5. Thereby, servicing of the carrier device 100 and the seating area divider 200 is simplified and comparatively easier accessible. Further, the fixation to the seat track 40 overcomes large gap creation and issue of rubbing parts.

The carrier device 100 may be arranged between two seats 30a and/or seat furniture structures 5. Due to the seat track fixation of the carrier device 100 relative movement of the carrier device 100 and so as the seating area divider 200 is ensured such that an even distance between the two seats 30a and/or seat furniture structures 5 is maintained. For example, the carrier device 100 moves with the seat tracks 40 in the same manner as the respective seats 30a arranged adjacent to the carrier device 100 and the seating area divider 200. Additionally, no further attachment devices have to be provided on the seats 30a and the seat furniture structures 5. This leads to reduction of manufacturing and assembly time.

If a connection between the carrier device 100 and the seat furniture structure 5 is requested, e.g. by a vehicle company, such as an airline, or requirements, such as safety requirements, a connection device 60, 600 as best shown in FIGS. 4 to 6C may be added to the carrier device 100. The carrier device 100 may comprise a connection device 60, 600 detachably mounted to the base member 300. For example, the connection device 60, 600 is configured as a quick-release and -locking device for fast and simplified assembly and disassembly. The connection device 60, 600 is configured to allow some degree of independent movement between the seat furniture structure 5 and the carrier device 100. For example, the connection device 60, 600 provides a bearing play. The bearing play allows some degree of tolerance compensation and the carrier device 100 and seat furniture structure 5 are allowed to float relative to each other in a controlled manner when, e.g. the cabin floor 20a flexes during flight. The connection device 60, 600 allows the carrier device 100 and so as the seating area divider 200 to move with the seat 30a and the seat furniture structure 5 whilst maintaining an almost even distance between the seats 30a and the seat furniture structures 5 arranged laterally to the carrier device 100 and overcoming a large gap creation on one or both seating sides.

The seat track locking members 401 each comprise at least one releasable latch element 402 for detachable fixation of the fixation device 400 to the seat track 40. For example, each seat track locking member 401 comprises at least one opening 403 to guide through the releasable latch element 402. The seat track locking member 401 and the releasable latch element 402 may be a one-piece element. For example, the latch element 402 is a not further shown plug-in connector, such as a bolt, a pin, a hook or the like. The releasable latch element 402 may be a separate mechanical track lock such as a screw or a bolt or the like. The releasable latch element 402 is inserted into and fixed to a desired seat track portion STn when mounted to said seat track 40.

The fixation device 400 comprises at least two seat track locking members 401 each protruding perpendicular from the base member 300. The at least two seat track locking members 401 are arranged parallel to each other and on opposite lateral sides 307 on the base member 300. For example, the seat track locking members 401 are configured as common seat track fittings. The seat track locking members 401 may be arranged in a center area in view of a longitudinal extending direction D1 of the base member 300.

The seat track locking members 401 may be arranged in a front area, rear area, i.e. a front end side 308, a rear end side 309, or in any area between the front and rear areas. In a not further shown example, the at least two seat track locking members 401 are arranged offset to each other and on opposite lateral sides 307 and/or on the same side 307 on the base member 300.

For example, the base member 300 and the fixation device 400 are configured as one-piece element or the fixation device 400 is a separate element mounted to the base member 300.

Each releasable latch element 402 is inserted into and fixed to a respective seat track portion ST1 when mounted to the seat track 40. For example, the seat track 40 comprises a plurality of insertion hole-like seat track portions ST1 extending along the seat track 40. The releasable latch elements 402 are plug-in-like elements corresponding to the seat track portions ST1. The seat track locking members 401 are arranged on opposite sides and parallel to each other on the base member 300. Both seat track locking members 401 are fixed to opposite seat tracks 40.

The base member 300 comprises a receiving portion 301 for storing and guiding not further shown cabling. For instance, electrical cabling may be arranged within the base member 300. Additionally or optionally, cabling may be arranged alongside the base member 300 to connect the seat 30a or the seats 30a electrically with a not further shown control unit. Commonly, seat-to-seat cable management is routed under feet of passengers, for example, along a raceway which causes a section of floor space in a passenger seating area to be raised.

The proposed example of the cable management within or alongside the base member 300 improves an optical appearance whilst avoiding raised floor sections below passenger feet. Further, the proposed example allows a seat manufacturer to better control the cabling between the seats 30a. Moreover, the seats 30a can be quickly removed and maintained and an installation of electrics can be carried out quick and easy.

The receiving portion 301 is, for example, a recess 6 within the base member 300 running along an extending direction D1 of the base member 300. Lateral sides 307 of the base member 300 may additionally or optionally comprise receiving portions 301, such as recesses 6. For example, the receiving portion 301 is provided on a lower side, such as a side facing the cabin floor 20a, of the base member 300. The base member 300 comprises a number of through holes 302. The through holes 302 provide a substantially lightweight design of the base member 300. Further, cabling may be guided through the through holes 302 connecting electric devices of a respective seat 30a or seats 30a.

For example, the base member 300 is substantially U-shaped or O-shaped in profile. For example, the recess 6 is formed by a not further shown open profile structure of the base member 300. For example, the base member 300 is substantially square tube shaped.

The carrier device 100 may be made of metal and/or synthetic material. The fixation device 400 may be form, force and/or firmly fitted to the base member 300. The base member 300 and the fixation device 400 may be configured as a one-piece structure. For example, the fixation device 400 is molded to the base member 300.

Figure 3A:
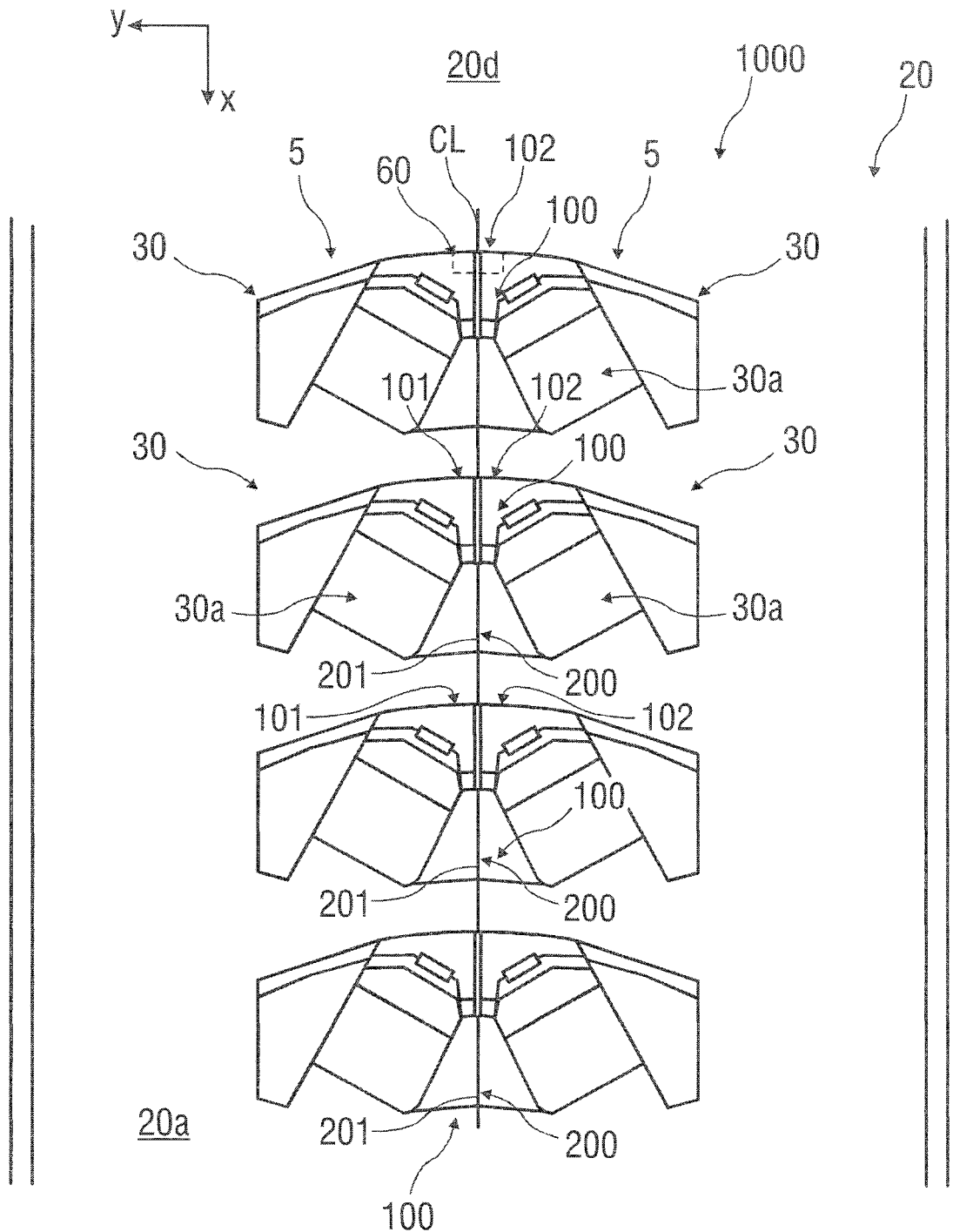
FIGS. 3A and 3B show schematically top views of embodiments of vehicle cabins each having a passenger seating arrangement

In a further embodiment, when at least two carrier devices 100 are arranged one behind another along the centerline CL, the base members 300 of each carrier device 100 may be connected to each other at their corresponding front and rear end sides 101, 102 as best shown in FIGS. 2 and 3A. For example, when at least two carrier devices 100 are arranged behind another, the rear end side 102 of the front carrier device 100 is in alignment with the front end side 101 of the rear carrier device 100.

As shown in FIG. 1B in more detail, a furniture structure 5 of a seat unit 30 is arranged slightly distanced by a gap G from the carrier device 100, in particular from the base member 300 and the fixation device 400. The furniture structure 5 may comprise a furniture base plate 50a, best shown in FIG. 1A, and/or different furniture parts 50b such as partition walls 50c, best shown in FIG. 2, partially surrounding the seat 30a. The furniture structure 5 is not directly attached to the carrier device 100. Moreover, the furniture structure 5 is fixed to the respective seat track 40 as the carrier device 100. The carrier device 100 is fixed on the same seat track 40 as the furniture structure 5 and/or the seat 30a.

FIG. 2 shows schematically a perspective view of an embodiment of a vehicle cabin 20, in particular an aircraft cabin 20, comprising two seat units 30 arranged along a centerline CL of the vehicle cabin 20. The vehicle cabin 20 further comprises a seating area divider 200 arranged between the two seat units 30. A plurality of seat tracks 40 is arranged within the vehicle cabin 20 and attached to the cabin floor 20a.

The seating area divider 200 comprises a privacy divider screen 201 and a carrier device 100 as described above. The seating area divider 200 creates privacy to each seat unit 30 and separates the seat units 30 in transverse direction of the vehicle cabin 20.

In the shown example, the base member 300 comprises a base beam 303 and two vertical beams 304 arranged on each front and rear end side 308, 309 of the base beam 303. For example, the vertical beams 304 are mounted to the front and rear end sides 308, 309 by welding, screwing, adhesive or the like. The carrier device 100 is substantially U-shaped. The beams 303, 304 may be configured as a one-piece structure, for example by forming or shaping.

The vertical beams 304 may comprise attachment elements 305 on outer surface sides, wherein when at least two carrier devices 100 are arranged one behind another along the centerline CL, the carrier devices 100 may be connected to each other at their corresponding front and rear vertical beams 304. The attachment elements 305 may be in form of through holes 302, wherein fixation of the vertical beams 304 to one another is provided by releasable fixation elements 7 such as simple plug-in connectors, bolts, screws or the like, as best shown in FIG. 2. Due to providing through holes 302 a lightweight design can be provided to the carrier device 100. Further, the vertical beams 304 may be formed substantially U-shaped in profile.

Within the two vertical beams 304 of one carrier device 100 the privacy divider screen 201 is arranged. For example, the privacy divider screen 201 comprises one continuous panel 8 or a number of movable panels 8 such as in way of a telescopic series. The carrier device 100 occupies a space centrally between two seat tracks 40 such that, when the furniture structures 5 for the seats 30a are attached to the seat tracks 40, the privacy divider screen 201 is positioned between the two fixed furniture structures 5.

For example, the vertical beams 304 comprise guiding portions 306 for receiving the privacy divider screen 201. The guiding portions 306 run along an extending direction D2 of the vertical beams 304. The privacy divider screen 201, such as an aircraft center screen, sheet or panel, is a removable component which can be serviced ex-situ. For example, the guiding portion 306 is configured to receive a not further shown screen cartridge.

The privacy divider screen 201 may be a telescopic adjustable screen. An actuation device 9, as shown in FIG. 2, for moving the privacy divider screen 201, for example between a stowed position and a deployed position, may be attached to the base member 300. In another example, the privacy divider screen 201 may be a fixed separation wall or manually adjustable.

Figure 3B:
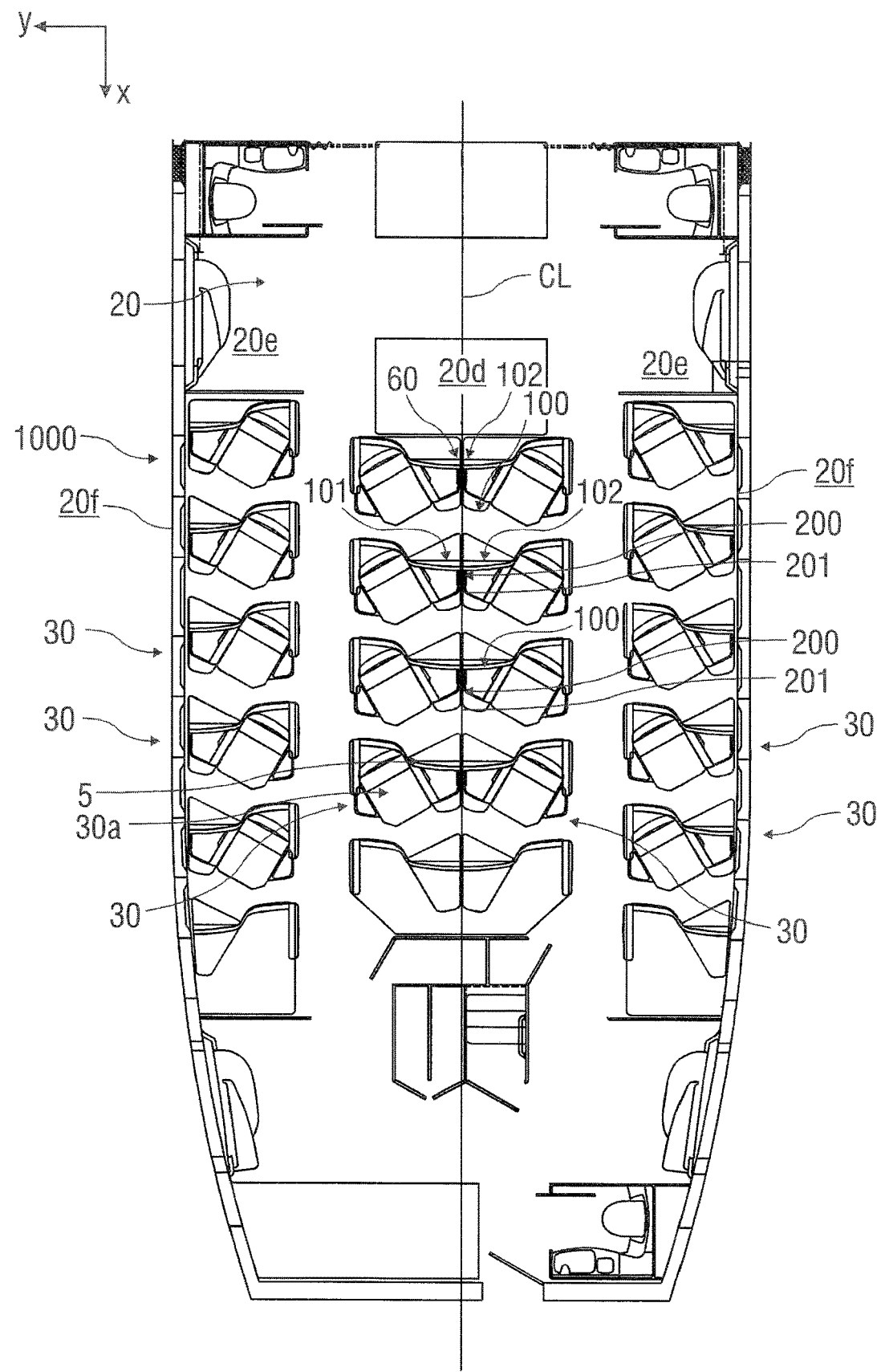

FIGS. 3A and 3B shows schematically in top views each a vehicle cabin 20, for example of an aircraft, having a passenger seating arrangement 1000. The vehicle cabin 20 comprises a cabin floor 20a, a number of seat tracks 40 as shown in FIG. 2 and a number of seat units 30 each having at least one seat 30a mounted on the seat track 40. A seating area divider 200 is arranged between two seat units 30 arranged adjacent each other in transverse extending direction of the vehicle cabin 20.

The seating area divider 200 separates two seating areas 20b, 20c in transverse direction. In particular, the seating area divider 200 divides the seats 30a of the two seat units 30 arranged next to each other in transverse direction. For example, FIG. 3A shows a center column 20d arranged along the centerline CL in the vehicle cabin 20. The center column 20d may comprise seat units 30 arranged in a so called herringbone design. Other seating arrangement layouts are possible, e.g. a so called in-line seating layout having seat units facing in the same or opposite directions.

The seat units 30 comprise angled seats 30a facing away from the centerline CL. FIG. 3B shows a center column 20d arranged along the centerline CL in the vehicle cabin 20 having seat units 30 with angled seats 30a facing towards the centerline CL. Outer columns 20e may comprise a plurality of seat units 30 having angled seats 30a facing towards a cabin wall 20f as shown or angled seats 30a facing away from the cabin wall 20f.

The seating area divider 200 comprises a carrier device 100 for retaining a privacy divider screen 201 of the seating area divider 200 between the two seat units 30. The carrier devices 100 are arranged along a centerline CL of the vehicle cabin 20 and are each fixed on same seat tracks 40 as the seats 30a of each seat unit 30. The seats 30a are mounted to the seat tracks 40 in conventional manner.

The privacy divider screen 201 may be configured as a one-piece, fixed screen or a 2- or 3-pieces dropping screen. The multi-pieces/parts of the privacy divider screen 201 may be telescopically movable in vertical direction such that different heights and/or functions are available to the passengers. In particular, in a lowest position of the privacy divider screen 201, the area adjacent to the privacy divider screen 201 may be used as a seating area extension or sleeping area extension. In a middle position of the privacy divider screen 201, an upper support portion of the privacy divider screen 201 may be used as a lateral armrest or support surface for the passenger. Additionally or optionally, the privacy divider screen 201 can comprise a flipping armrest which can be fold down and fold up from a plane of the privacy divider screen 201. In an upper position of the privacy divider screen 201, the privacy divider screen 201 is used e.g. as a divider between two seat units 30

If a mounting of the seat furniture structure 5 is requested, a connection device 60, 600 may be provided to the carrier device 100. The connection device 60, 600 is indicated in FIGS. 3A and 3B by dotted lines.

Figure 4:
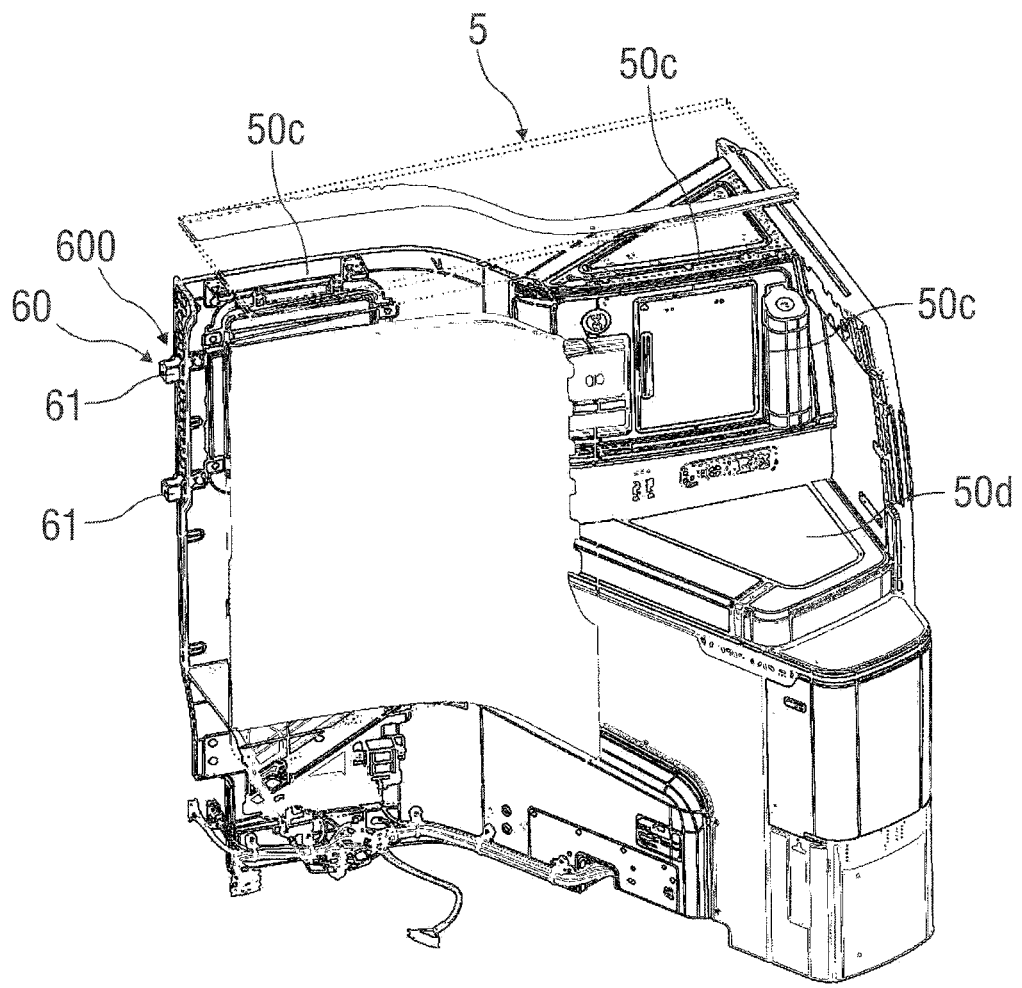
FIG. 4 shows schematically in a perspective views an embodiment of a seat furniture structure.

FIG. 4 shows schematically a perspective view of a furniture structure 5 comprising at least a number of partition walls 50c and a console 50d. The connection device 60 comprises at least one bracket 61. The bracket 61 is mounted to the partition wall 50c. In the shown example, the connection device 60 comprises two brackets 61. The brackets 61 arranged distanced from each other. The connection device 60 is configured to provide a connection between the seating area divider 200 and the two adjacent furniture structures 5.

Figure 5A:
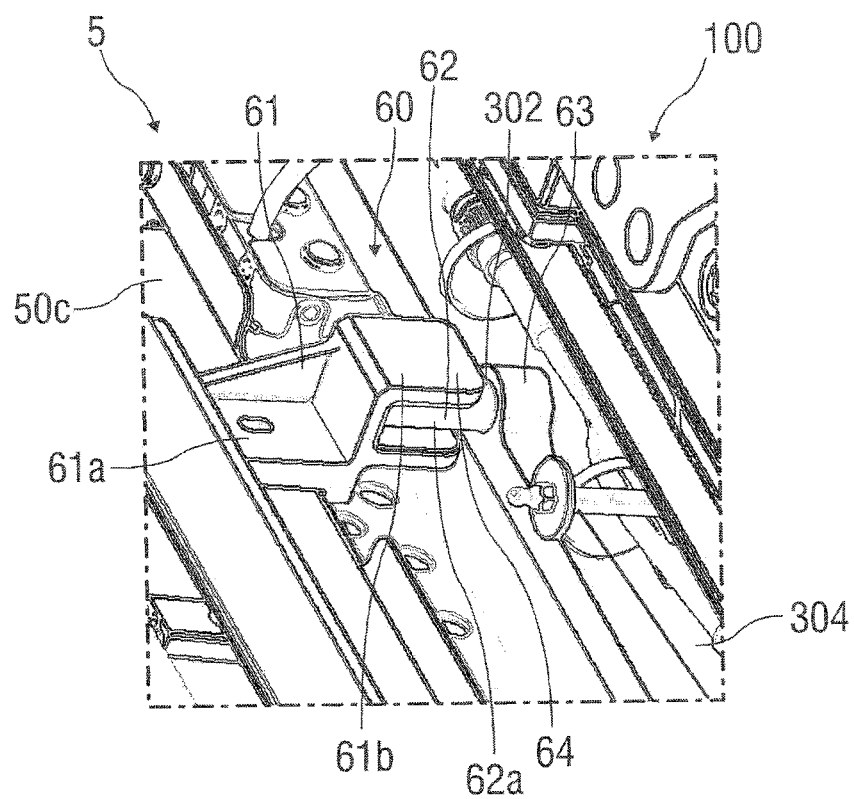
FIGS. 5A and 5B show schematically in perspective views an embodiment of a connection device of the carrier device.
Figure 5B:
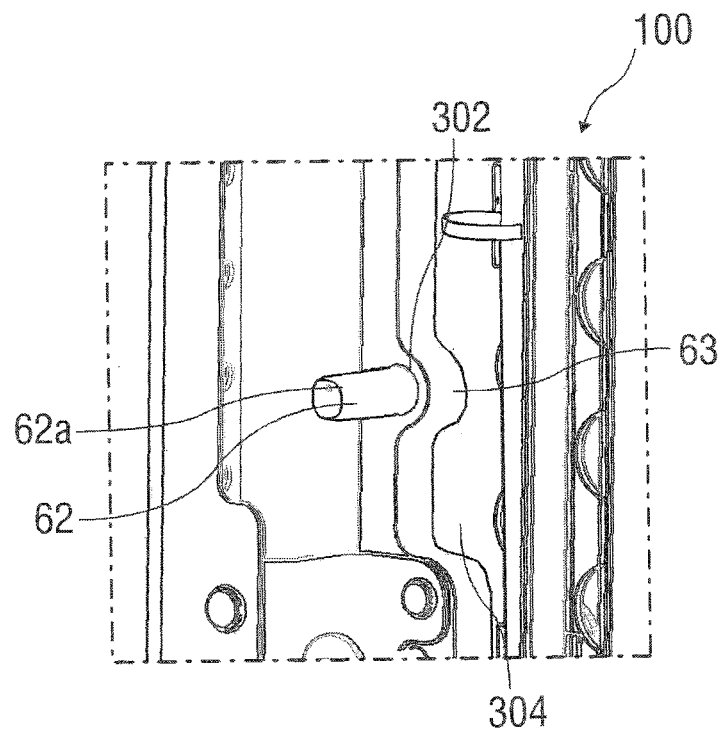

FIGS. 5A and 5B show schematically in perspective views an example of a connection device 60 comprising at least a bracket 61 mounted on the partition wall 50c and at least one coupling element 62.

The coupling element 62 is mounted to the carrier device 100, for example to the base member 300. For example, the coupling element 62 is arranged and fitted in one of the through holes 302 of the vertical beam 304 of the base member 300. In the shown example, the vertical beam 304 comprises a thickening portion 63. The through hole 302 for the coupling element 62 is provided in the thickening portion 63.

The coupling element 62 is at least form fitted in the through hole 302. The coupling element 62 is, for example, configured as a tie rod. The coupling element 62 comprises one end 62a extending from the through hole 302. For example, the end 62a is projecting from the thickening portion 63 towards the furniture structure 5. The end 62a may be coated with a rubber and/or conventional a damping material.

The coupling element 62 may be configured as a sleeve. The bracket 61 and the coupling element 62 are in a locking engagement. For example, the bracket 61 comprises a first portion 61a mounted to the partition wall 50c. The bracket 61 further comprises a second portion 61b which is in locking engagement with the coupling element 62. The second portion 61b is configured as a clamp 64 receiving the coupling element 62 in a clamping and locking manner. The clamp 64 is formed substantially U-shaped or C-shaped. For example, the bracket 61 and the coupling element 62 are releasable attached to one another.

FIG. 5A shows the bracket 61 and the coupling element 62 in locking engagement. FIG. 5B shows the connection device 60 without the bracket 61.

Figure 6A:
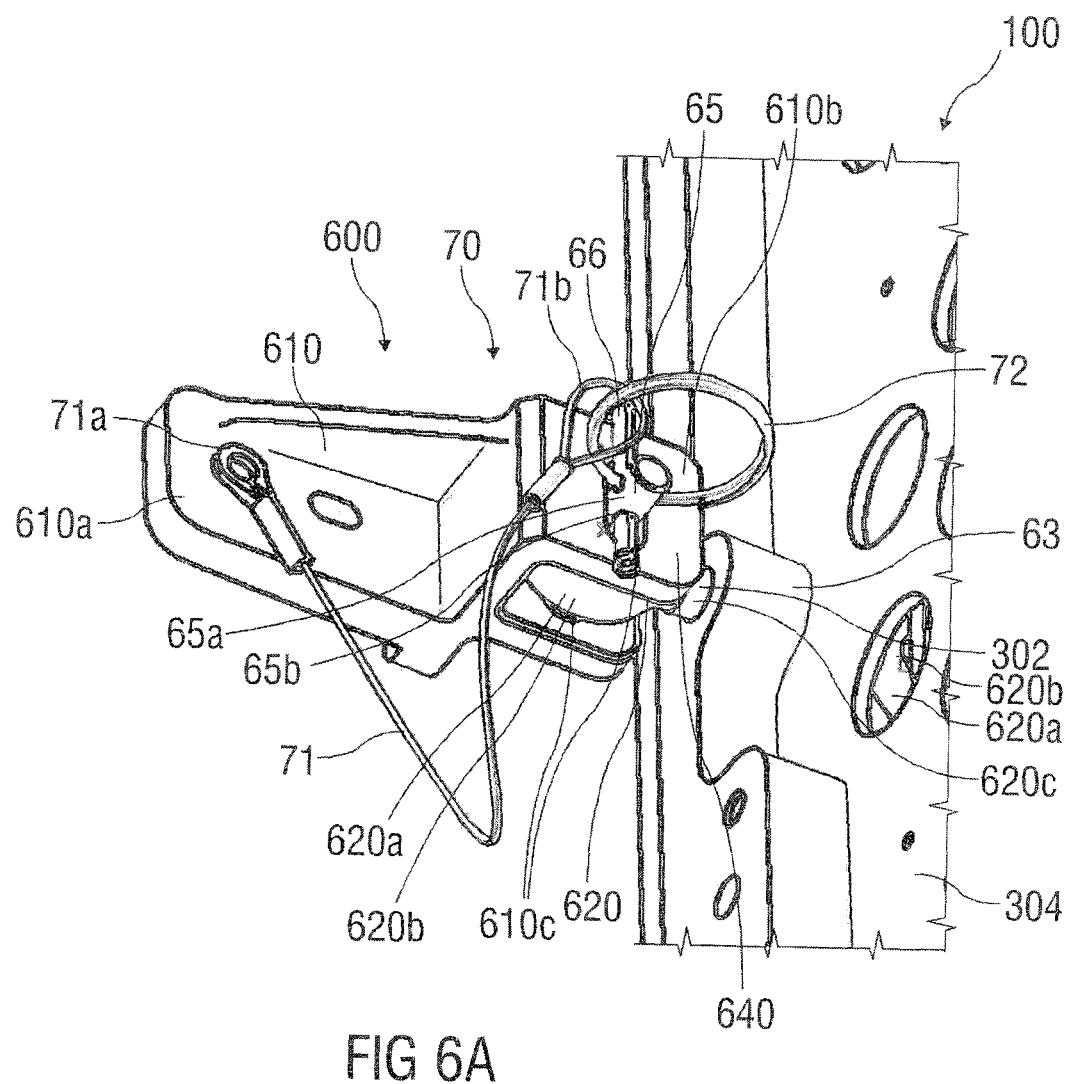
FIGS. 6A to 6C show schematically in perspective views an embodiment of a connection device of the carrier device.
Figure 6B:
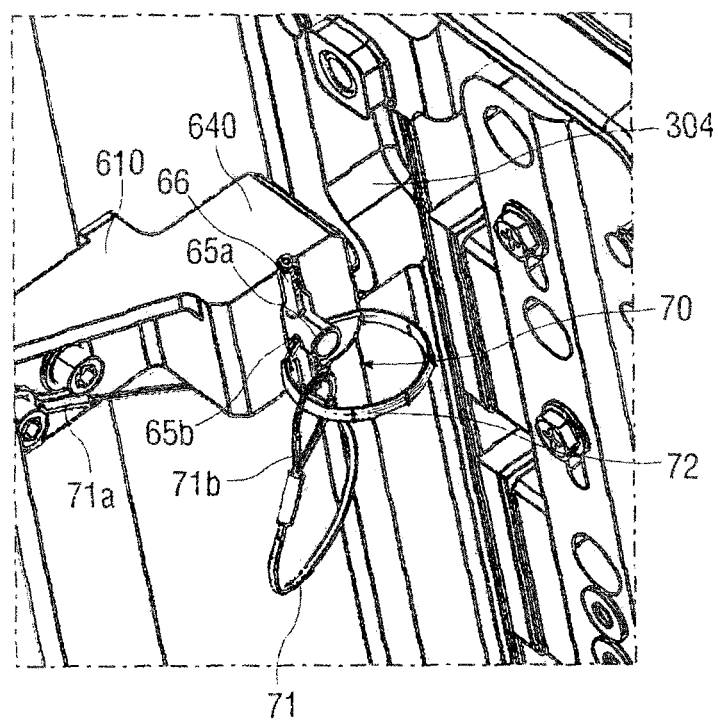
Figure 6C:
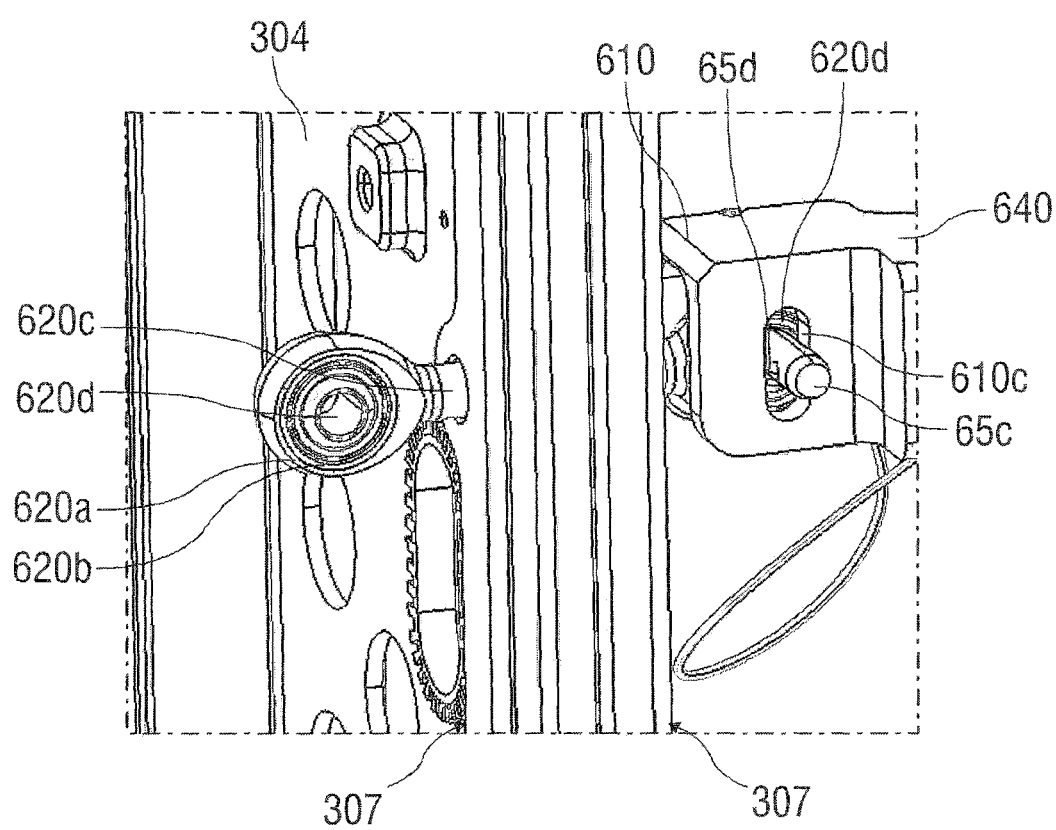

FIGS. 6A to 6C show schematically in a perspective views an example of the connection device 600. The shown connection device 600 comprises a bracket 610 mounted to the partition wall 50c and a coupling element 620 guided through a through hole 302 provided on the carrier device 100.

The base member 300, in particular the vertical beam 304, comprises a thickening portion 63 in which the through hole 302 is formed. In the shown example, the coupling element 620 comprises two free ends 620a extending on opposite lateral sides 307 of the base member 300, for example of the vertical beam 304, as best shown in FIG. 6C. The free ends 620a each comprises a bearing element 620b. The bearing element 620b may be configured as a bearing, a ball bearing or a spherical bushing.

The coupling element 620 further comprises a tie rod portion 620c coupling both ends 620a. The tie rod portion 620c is guided through the through hole 302. Further, the bracket 610 comprises one portion 610a mounted to the furniture structure 5. The bracket 610 comprises another portion 610b facing in a direction towards the carrier device 100. The second portion 610b is configured as a clamp 640 receiving one of the bearing elements 620b of the coupling element 620. The clamp 640 is formed substantially U-shaped or C-shaped. Further, the connection device 600 comprises a quick release and locking pin 65 to secure the bracket 610 to the coupling element 620. For example, the bracket 610 and the coupling element 620 are releasable attached to one another.

For example, the pin 65 secures the clamp 640 to the bearing element 620*b*. The pin 65 is guided through elongated holes 610*c* formed through the clamp 640, as best shown in FIGS. 6A and 6C, and an opening 620*d* arranged centric in the bearing element 620*b*, as best shown in FIG. 8C. To lock the pin 65 to the clamp 640, the pin 65 comprises on end 65*a* an opening 65*b*, as best shown in FIGS. 6A and 6B.

A locking bolt 66 longer than the elongated hole 610*c* is provided to be arranged in the opening 65*b* and therefore to secure the pin 65 against the clamp 640. On the other end 65*c* of the pin 65, the pin 65 comprises a common movable self-locking stud 65*d*, as best shown in FIG. 8C.

To provide easy handling of the connection device 600, the connection device 600 comprises a loss prevention device 70, as best shown in FIGS. 6A and 6B. The loss prevention device 70 improves assembly and disassembly of the connection device 600 providing easy handling of single components of the connection device 600. The loss prevention device 70 comprises a loss prevention wire 71 coupled to the pin 65. For example, one end 71*a* of the wire 71 is mounted to the bracket 610, for example to the first portion 610*a*. A second end 71*b* of the wire 71 is coupled to the pin 65 via a ring 72 mounted on the pin 65. Optionally, the wire 71 may be directly mounted, for example via adhesive or welding, to the pin 65.

Figure 7:
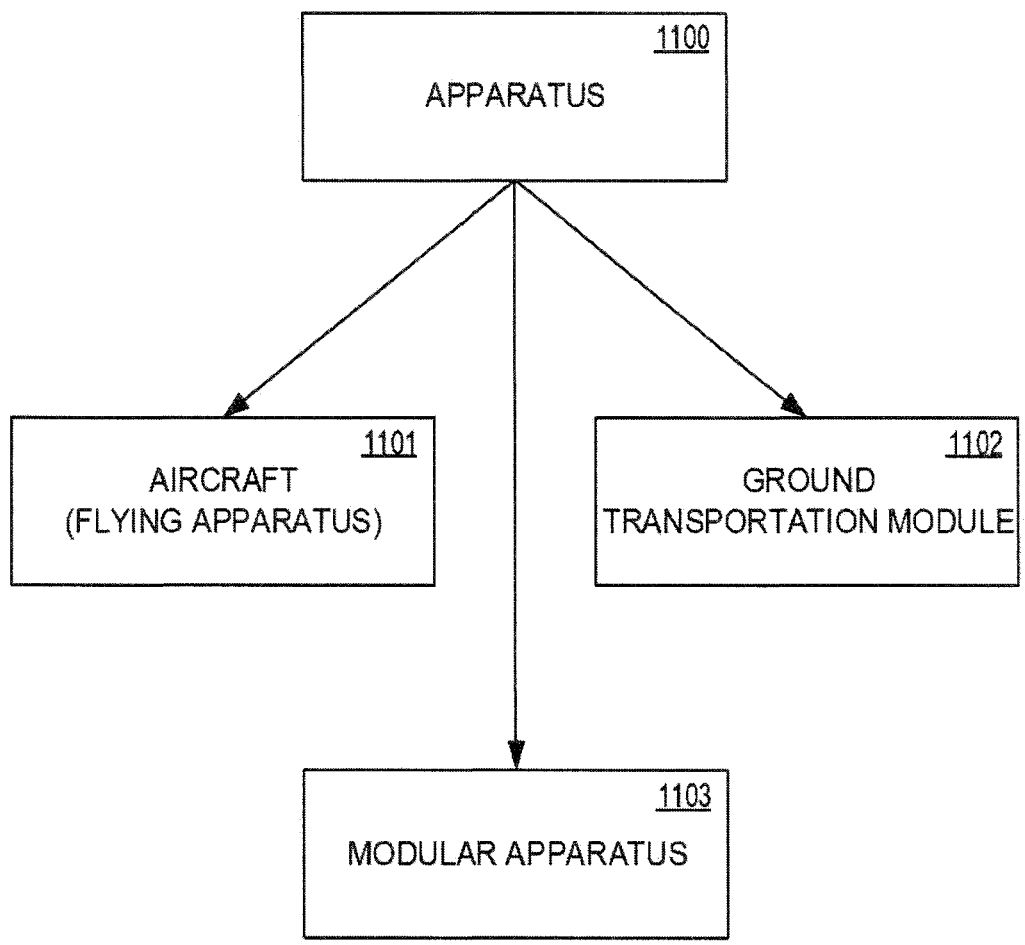
FIG. 7 shows a block diagram of an apparatus for which various aspects of the disclosure can be employed in accordance with an example.

With reference now to FIG. 7, the apparatus 1100 is provided. As shown in FIG. 7, an example of the apparatus 1100 is a flying apparatus 1101, such as an aerospace vehicle, aircraft, air cargo, flying car, satellite, planetary probe, deep space probe, solar probe, and the like. As also shown in FIG. 7, a further example of the apparatus 1100 is a ground transportation apparatus 1102, such as an automobile, a truck, heavy equipment, construction equipment, a boat, a ship, a submarine, and the like. A further example of the apparatus 1100 shown in FIG. 7 is a modular apparatus 1103 that comprises at least one or more of the following modules: an air module, a payload module, and a ground module. The air module provides air lift or flying capability. The payload module provides capability of transporting objects such as cargo or live objects (people, animals, etc.). The ground module provides the capability of ground mobility. The disclosed solution herein is applied to each of the modules separately or in groups such as air and payload modules, or payload and ground, etc. or all modules.

Figure 8:
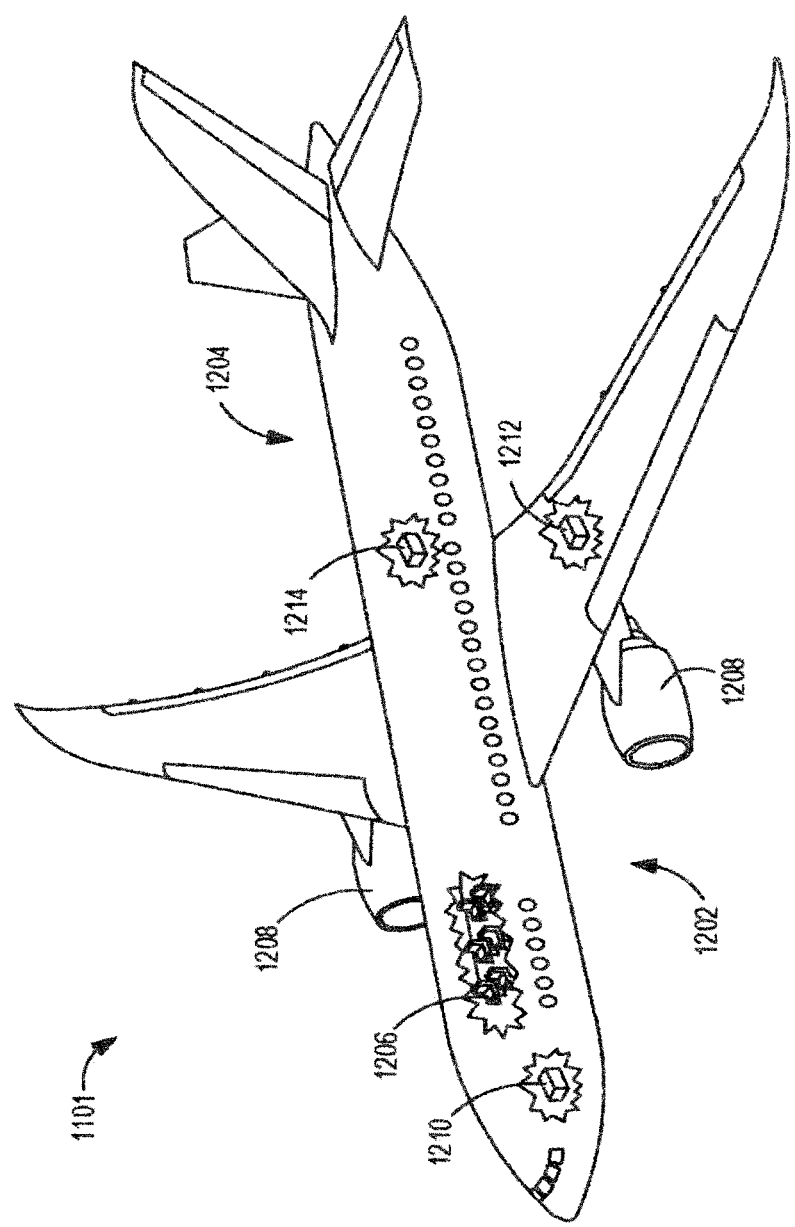
FIG. 8 shows a schematic perspective view of a particular flying apparatus in accordance with an example.

With reference now to FIG. 8, a more specific diagram of the flying apparatus 1101 is depicted in which an implementation of the disclosure is advantageously employed. In this example, the flying apparatus 1101 is an aircraft produced by an apparatus manufacturing and service method and includes an airframe 1202 with a plurality of systems 1204 and an interior 1206. Examples of the plurality of systems 1204 include one or more of a propulsion system 1208, an electrical system 1210, a hydraulic system 1212, and an environmental system 1214. However, other systems are also candidates for inclusion. Although an aerospace example is shown, different advantageous examples are applied to other industries, such as the automotive industry, etc.

When introducing elements of aspects of the disclosure or the implementations thereof, the articles "a," "an," "the," and "said" are intended to mean that there are one or more of the elements. The terms "comprising," "including," and "having" are intended to be inclusive and mean that there could be additional elements other than the listed elements. The term "implementation" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

CLAUSES

Further, the disclosure comprises embodiments according to the following clauses:

Clause 1. A carrier device for a seating area divider provided within a vehicle cabin, the carrier device comprising:
   a base member and
   a fixation device which is coupled to the base member to support the base member on a cabin floor; wherein
   the base member is configured to carry a privacy divider screen; and
   the fixation device comprises at least a seat track locking member protruding substantially perpendicular from the base member.

Clause 2. The carrier device according to clause 1, wherein the seat track locking member is configured to fit on different seat track portions of a seat track arranged on the cabin floor.

Clause 3. The carrier device according to clause 1 or 2, wherein the seat track locking member comprises a releasable latch element.

Clause 4. The carrier device according to clause 1, wherein the fixation device comprises at least two seat track locking members each protruding perpendicular from the base member.

Clause 5. The carrier device according to clause 4, wherein the at least two seat track locking members are arranged parallel to each other and on opposite lateral sides of the base member.

Clause 6. The carrier device according to clause 4, wherein the at least two seat track locking members are arranged offset to each other and on opposite lateral sides and/or on the same lateral side on the base member.

Clause 7. The carrier device according clause 1, wherein the base member and the fixation device are configured as one-piece element or the fixation device is a separate element mounted to the base member.

Clause 8. The carrier device according to clause 1, wherein the base member comprises a base beam and at least one vertical beam arranged on an end side of the base beam.

Clause 9. The carrier device according to clause 8, wherein the base beam comprises at least one receiving portion for storing and guiding cabling, wherein the receiving portion is arranged at least partially running along an extending direction of the base beam.

Clause 10. The carrier device according to clause 8, wherein the at least one vertical beam comprises a guiding portion for the privacy divider screen at least partially running along an extending direction of the vertical beam.

Clause 11. The carrier device according to clause 1, wherein the base member comprises at least one connection device configured to couple a seat furniture structure to the base member.

Clause 12. The carrier device according to clause 11, wherein the connection device comprises at least one coupling element arranged on the vertical beam of the base member.

Clause 13. The carrier device according to clause 12, wherein at least one end of the coupling element is projecting substantially perpendicular from the vertical beam of the base member.

Clause 14. The carrier device according to clause 11, wherein the connection device comprises at least one bracket mounted to a seat furniture structure.

Clause 15. The carrier device according to clauses 12 and 14, wherein the coupling element and the bracket are releasable attached to one another.

Clause 16. The carrier device according to clause 11, wherein the connection device comprises at least one loss prevention device.

Clause 17. A seating area divider for a vehicle cabin, the seating area divider comprising:
a privacy divider screen; and
a carrier device having:
a base member and
a fixation device which is coupled to the base member to support the base member on a cabin floor, wherein the base member is configured to carry a privacy divider screen, and the fixation device comprises at least a seat track locking member protruding substantially perpendicular from the base member.

Clause 18. The seating area divider according to clause 17, wherein the carrier device comprises at least one actuation device for moving the privacy divider screen between a stowed position and a deployed position.

Clause 19. A vehicle cabin comprising:
a cabin floor,
a number of seat tracks mounted on the cabin floor in a longitudinal direction of the cabin floor;
a number of seat units each having at least one seat mounted on the seat track; and
a seating area divider having:
a privacy divider screen; and
a carrier device having a base member and a fixation device which is coupled to the base member to support the base member on the cabin floor, wherein the base member is configured to carry the privacy divider screen, and the fixation device comprises at least a seat track locking member protruding substantially perpendicular from the base member;
wherein the seating area divider is arranged adjacent to at least one seat and extends along the longitudinal direction of the cabin floor.

Clause 20. The vehicle cabin according to clause 19, wherein the carrier device is fixed on the same seat track as the at least one seat.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A carrier device for a seating area divider provided within an aircraft cabin, the carrier device comprising:

a base member including a vertical beam to support the seating area divider on a cabin floor, the vertical beam having a plurality of through holes; and
at least one connection device detachably mounted to the vertical beam to couple the base member to a seat furniture structure, the at least one connection device including a bracket mounted on the seat furniture structure, and at least one coupling element mounted to the base member in a releasable locking engagement with the bracket, wherein the coupling element has two free ends extending on opposite lateral sides of the vertical beam, and a tie rod portion coupling both free ends.

2. The carrier device of claim 1, wherein the tie rod portion is guided through one of the through holes of the vertical beam.

3. The carrier device of claim 1, wherein the free ends each comprise a bearing element.

4. The carrier device of claim 3, wherein the bracket comprises a first bracket portion mounted to the seat furniture structure, and a second bracket portion configured as a clamp to receive one of the bearing elements.

5. The carrier device of claim 4, wherein the connection device further includes a locking pin to releasable attach the bracket to the coupling element.

6. The carrier device of claim 5, wherein the locking pin is guided through holes formed through the clamp and an opening arranged centric in the bearing element.

7. The carrier device of claim 6, wherein the connection device further includes a locking bolt arranged in the opening to secure the locking pin against the clamp.

8. A seating area divider for an aircraft cabin, the seating area divider comprising:
a privacy divider screen; and
a carrier device including a base member including a vertical beam to support the privacy divider screen on a cabin floor, the vertical beam having a plurality of through holes, and at least one connection device detachably mounted to the vertical beam to couple the base member to a seat furniture structure, the at least one connection device including a bracket mounted on the seat furniture structure, and at least one coupling element mounted to the base member in a releasable locking engagement with the bracket, wherein the coupling element has two free ends extending on opposite lateral sides of the vertical beam, and a tie rod portion coupling both free ends.

9. The seating area divider of claim 8, wherein the tie rod portion is guided through one of the through holes of the vertical beam.

10. The seating area divider of claim 8, wherein the free ends each comprise a bearing element.

11. The seating area divider of claim 10, wherein the bracket comprises a first bracket portion mounted to the seat furniture structure, and a second bracket portion configured as a clamp to receive one of the bearing elements.

12. The seating area divider of claim 11, wherein the connection device further includes a locking pin to releasable attach the bracket to the coupling element.

13. The seating area divider of claim 12, wherein the locking pin is guided through holes formed through the clamp and an opening arranged centric in the bearing element.

14. The seating area divider of claim 13, wherein the connection device further includes a locking bolt arranged in the opening to secure the locking pin against the clamp.

15. An aircraft cabin, comprising:
   a cabin floor;
   a plurality of seat units; and
   a seating area divider comprising:
      a privacy divider screen; and
      a carrier device including a base member including a vertical beam to support the privacy divider screen on the cabin floor, the vertical beam having a plurality of through holes, and at least one connection device detachably mounted to the vertical beam to couple the base member to a seat furniture structure, the at least one connection device including a bracket mounted on the seat furniture structure, and at least one coupling element mounted to the base member in a releasable locking engagement with the bracket, wherein the coupling element has two free ends extending on opposite lateral sides of the vertical beam, and a tie rod portion coupling both free ends.

16. The aircraft cabin of claim 15, wherein the tie rod portion is guided through one of the through holes of the vertical beam.

17. The aircraft cabin of claim 15, wherein the free ends each comprise a bearing element.

18. The aircraft cabin of claim 17, wherein the bracket comprises a first bracket portion mounted to the seat furniture structure, and a second bracket portion configured as a clamp to receive one of the bearing elements.

19. The aircraft cabin of claim 18, wherein the connection device further includes a locking pin to releasable attach the bracket to the coupling element.

20. The aircraft cabin of claim 19, wherein the locking pin is guided through holes formed through the clamp and an opening arranged centric in the bearing element.

* * * * *